No. 617,821. Patented Jan. 17, 1899.
L. P. STREET.
PLANTER.
(Application filed July 12, 1897.)
(No Model.)
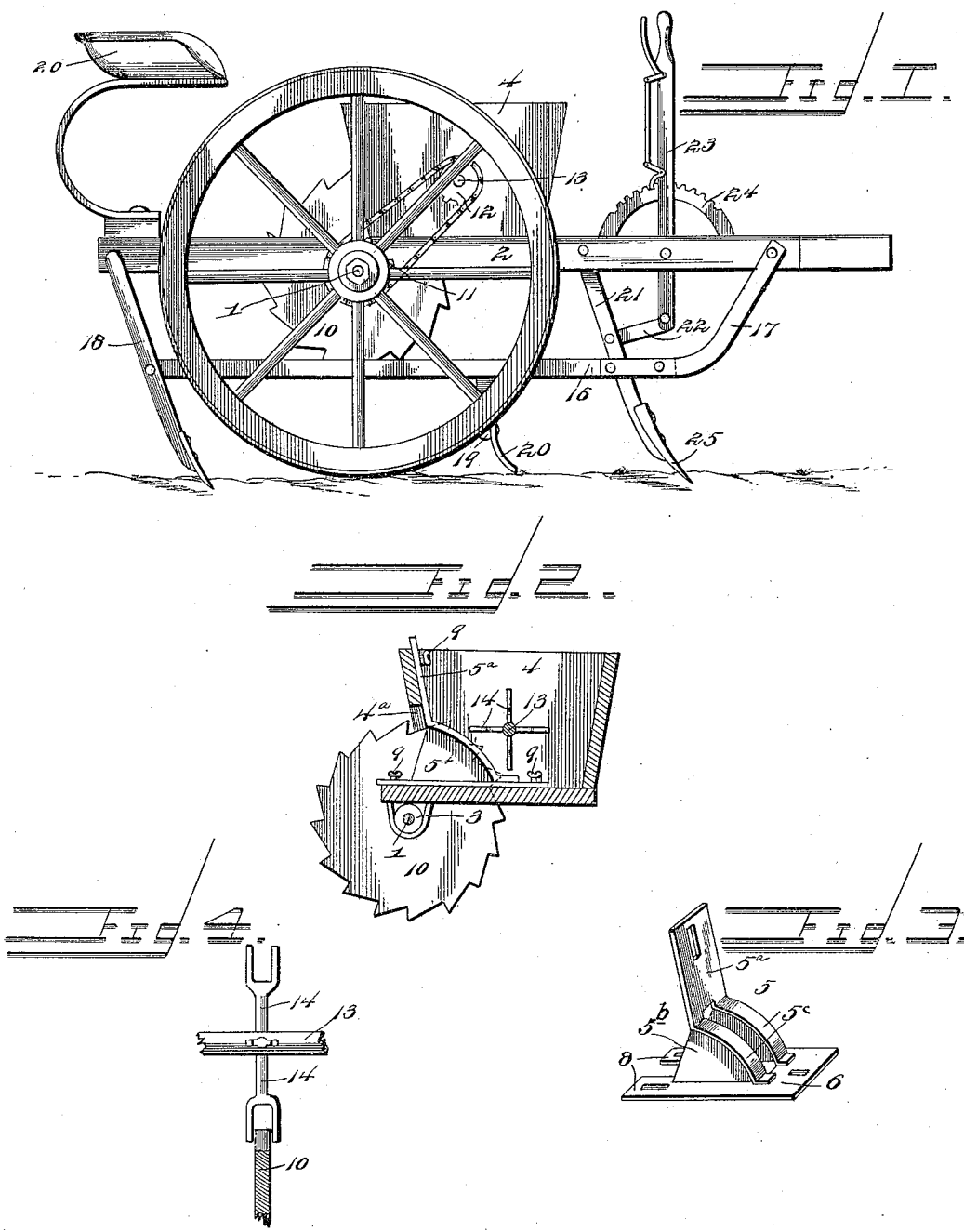
Witnesses
R. H. Shepard
J. F. Riley
LeeRoy P. Street Inventor
By HIS Attorneys,
C. A. Snow & Co.

UNITED STATES PATENT OFFICE.

LEEROY P. STREET, OF REEDSVILLE, TEXAS.

PLANTER.

SPECIFICATION forming part of Letters Patent No. 617,821, dated January 17, 1899.

Application filed July 12, 1897. Serial No. 644,284. (No model.)

*To all whom it may concern:*

Be it known that I, LEEROY P. STREET, of Reedsville, in the county of Caldwell and State of Texas, have invented certain new and useful Improvements in Corn-Planters; and I do hereby declare the following to be a full, clear, and exact description of the invention, such as will enable others skilled in the art to which it appertains to make and use the same.

The invention relates to improvements in planters.

The object of the present invention is to improve the construction of sulky-planters and to provide a simple and efficient one adapted for use in planting cotton-seed, but which will also be applicable to the planting of corn.

A further object of the invention is to insure a positive feed of the seed and to enable such feed to be readily regulated.

The invention consists in the construction and novel combination and arrangement of parts, as hereinafter fully described, illustrated in the accompanying drawings, and pointed out in the claim hereto appended.

In the drawings, Figure 1 is a side elevation of a planter constructed in accordance with this invention. Fig. 2 is a detail sectional view taken longitudinally of the feed-box or hopper and illustrating the construction of the feed-wheel and the feed-regulating device. Fig. 3 is a detail perspective view of the adjustable feed-regulator. Fig. 4 is a detail view showing one of the rotating stirrer-arms straddling the feed disk or wheel.

Like numerals of reference designate corresponding parts in all the figures of the drawings.

1 designates an axle receiving the usual carrying-wheels, one of which is fixed to the axle for imparting a rotary movement thereto, and the other wheel is preferably loose on the axle for facilitating the turning of the planter. The axle supports a main frame 2, which is preferably composed of longitudinal side bars and transverse connecting-bars arranged at intervals, and the main frame is provided at opposite sides with bearing-sleeves 3, secured to it by staples or other suitable fastening devices and receiving the axle 1, whereby the latter is journaled on the main frame.

A hopper or feed-box 4 is mounted upon the main frame and is in practice detachably secured to the same to enable either a cotton-seeding device or hopper or a feed-box or hopper for the reception and distribution of corn to be employed. The hopper is provided at its lower end and rear face with a slot or opening $4^a$, forming the seed-outlet and in part covered by an adjustable feed-regulator 5, consisting of a bifurcated bottom plate 6 and an upwardly-extending plate $5^a$. The bottom plate 6 is bifurcated, and the arms 8, formed by the bifurcation, are slotted and secured to the bottom of the hopper by thumb-screws 9, passing through the slots in the bottom plate and securing the regulator at the desired adjustment and enabling the size of the slot or opening $4^a$ to be varied. The upwardly-extending plate $5^a$ of the regulator is slotted near its upper end and secured by a thumb-screw 9, which assists in the adjustment of the feed-regulator. The lower portion of the upwardly-extending plate is bifurcated and provided with extensions $5^b$, substantially quadrant-shaped and having their curved edges or portions united to the arms $5^c$, which are curved. The extensions $5^b$ form side walls and prevent access of seed to the feed-regulator except through the opening between the curved arms $5^c$. The regulator is adapted to be adjusted back and forth and also in an upward direction for regulating the degree of projection of teeth of a feed wheel or disk 10 between the arms of the slotted regulator, whereby the discharge of seed may be regulated. The feed wheel or disk 10, which is fast on the axle, is provided at its periphery with saw-shaped teeth adapted to enter the slot in the feed-regulator and project into the hopper to an extent governed by the adjustment of the regulator.

A sprocket-wheel 11, which is fixed to one end of the axle, is connected by a sprocket-chain with a similar sprocket-wheel 12, mounted on and fixed to a shaft 13, which is journaled in the side walls of the feed-box or hopper 4. The shaft 13 carries a series of radially-disposed stirrer-arms 14, which serve to agitate the seed within the hopper and cause the same to be brought in proper relation with the feed disk or wheel. The stirrer-arms, which are centrally arranged on the shaft, are bifurcated or forked, and the sides or arms of the forks or bifurcations pass upon opposite sides of the teeth of the feed-disk for bringing the seed directly to the same to insure the proper discharge of the seed.

The planter is provided at opposite sides with longitudinal bars 16, provided at their front ends with curved extensions 17, which are pivoted at their upper ends to the frame. The rear ends of the bars 16 are pivoted to shanks or bars 18, carrying cultivator-teeth, and a shank or bar 19 is secured to each of the bars 16 at a point between the ends thereof. The upper ends of the bars or shanks 18 are pivotally connected to the main frame, near the back thereof, and the tooth 20 on the shank 19 is designed to open a furrow for the reception of the seed discharged through the operation of the feed disk or wheel. The standards 18 are provided with suitable hoes or shovels for covering the seed, and under the arrangement of the longitudinal bars 16 the shovels or hoes are allowed to rest upon the ground; but the bars 16 may be provided with any suitable lever arrangement for controlling the adjustment of the shovels.

A shovel-standard 21 is pivoted at its upper end to the main frame and is provided with a suitable shovel 25 for opening the ground in advance of the furrow-opener 20. The standard 21 is pivotally connected to the rear end of the link 22, which is similarly secured to the lower end of an operating-lever 23, fulcrumed between its ends on the main frame and located adjacent to a toothed segment 24, which is engaged by a pawl on the lever 23 for holding the latter at any desired adjustment, the adjustment of the lever being for the purpose of regulating the depth the shovel 25 enters the ground. The lever 23 is arranged within easy reach of the attendant upon the seat 26, mounted upon the spring-standard and secured to the frame at the back thereof. The seed box or hopper is designed to be provided with a suitable cover and with means for securing the same in its closed position.

The invention has the following advantages: The planter, which is simple and comparatively inexpensive in construction, is adapted to be readily regulated to control the discharge of the seed, and the latter is positively carried to the seed slot or opening and discharged therethrough by the bifurcated stirrer-arms and the toothed disk or wheel. The feed-regulator is adapted to be adjusted both backward and forward and may be raised and lowered to cause the teeth of the feed disk or wheel to project through the slot or opening of the feed-regulator to the desired extent.

Changes in the form, proportion, and minor details of construction may be resorted to without departing from the spirit or sacrificing any of the advantages of this invention.

What is claimed is—

The combination of a hopper provided at its bottom with a slot or opening, a feed disk or wheel mounted in the slot or opening and provided at its periphery with teeth, and the rotating stirrer-arms having forked or bifurcated lower outer ends arranged to straddle the teeth of the feed disk or wheel, and adapted to carry seed to the same, substantially as described.

In testimony whereof I have signed this specification in the presence of two subscribing witnesses.

L. P. STREET.

Witnesses:
J. N. HOLLAND,
H. B. JONES.